United States Patent [19]
Bannon

[11] 3,881,243
[45] May 6, 1975

[54] METHOD OF MAKING PERMANENT MAGNET ROTOR FOR A SYNCHRONOUS MOTOR

[75] Inventor: Albert C. Bannon, Indianapolis, Ind.

[73] Assignee: P. R. Mallory & Co. Inc., Indianapolis, Ind.

[22] Filed: Dec. 10, 1973

[21] Appl. No.: 423,183

Related U.S. Application Data

[62] Division of Ser. No. 342,072, March 16, 1973.

[52] U.S. Cl. .................. 29/598; 156/73; 310/42; 310/43; 310/156
[51] Int. Cl. .......................................... H02k 15/04
[58] Field of Search ................... 29/598, 596, 608; 310/40 MM, 42, 43, 154, 156; 156/73

[56] References Cited
UNITED STATES PATENTS

| | | | |
|---|---|---|---|
| 3,119,941 | 1/1964 | Guiot | 310/156 |
| 3,680,203 | 8/1972 | Braiman et al. | 156/73 |
| 3,728,786 | 4/1973 | Lucas et al. | 29/598 |

*Primary Examiner*—Carl E. Hall
*Attorney, Agent, or Firm*—Charles W. Hoffmann; Robert F. Meyer; Donald W. Hanson

[57] ABSTRACT

A permanent magnet is carried by two sections of a hub, the sections being bonded together by welding.

3 Claims, 3 Drawing Figures

PATENTED MAY 6 1975 3,881,243

METHOD OF MAKING PERMANENT MAGNET ROTOR FOR A SYNCHRONOUS MOTOR

This is a division, of application Ser. No. 342,072 filed Mar. 16, 1973

Generally speaking, the present invention relates to a rotor comprising a hub which includes at least two sections bonded together, and a permanent magnet carried about a periphery of the two sections. In general, the two sections are bonded together through welding, the welding, in the illustrative embodiment being accomplished by the application of ultrasonic vibrations.

The rotor of the present invention has particular utility in small synchronous motors.

There are a multitude of applications for small synchronous motors of the type having a small permanent magnet rotor. Many of these applications are in timing devices such as clocks or in appliances such washers and dryers which utilize time sequence switches. In such applications it is of prime importance that the various elements of the synchronous motor be fabricated and assembled together at very close tolerances. And, even though very close tolerances are required, the cost of fabrication of the various elements as well as the cost of their assembly should be kept at a minimum. Typical of such elements is that of the rotor.

At one time the rotors were fabricated of a permanent magnet material in the form of a disc, the disc being magnetized so that one face was polarized north and the other south. The disc was then sandwiched between two metal spiders, the legs of which would then serve as pole pieces of opposite polarity. This type of rotor was somewhat difficult to fabricate to close tolerances and therefore somewhat costly. Of recent years, permanent magnet materials have been developed that permit poles of opposite polarity to be impressed in their periphery. The polarlized permanent magnet is then secured to a support or hub. Various means have been employed to secure the magnet to the hub including the use of adhesives and insert molding. While this technique has been for the most part satisfactory, the rotors still are somewhat costly due to the cost of manufacturing to close tolerances.

Among the features of the present invention is the provision of a permanent magnet rotor which is easy to produce at close tolerances and therefore relatively inexpensive. Another feature of the invention is to provide a permanent magnet rotor for a synchronous motor. Still another feature of the invention is the provision of a permanent magnet rotor having a permanent magnet carried by a hub that is comprised of at least tow sections, bonded together. Yet another feature of the invention is the provision of a permanent magnet rotor wherein a permanent magnet is carried between two sections of a hub, the sections being welded together. Yet still another object of the invention is the provision of a permanent magnet rotor wherein a permanent magnet is carried between two sections of a hub, the sections being ultrasonically bonded together. Still another feature of the invention is the provision of permanent magnet rotor wherein a permanent magnet is carried between two sections of a hub, the sections being ultrasonically bonded together, with the permanent magnet having means receiving material flowing from the sections as a result of the ultrasonic vibrations. Another feature of the invention is the provision of a method of forming a permanent magnet rotor. And another feature of the invention is the provision of a method of forming a permanent magnet rotor wherein a permanent magnet is carried between at least two sections of a hub, the sections of the hub being bonded together.

These and other feature of the invention will become apparent from the following description taken in conjunction with the accompanying drawings wherein.

Figure 1:
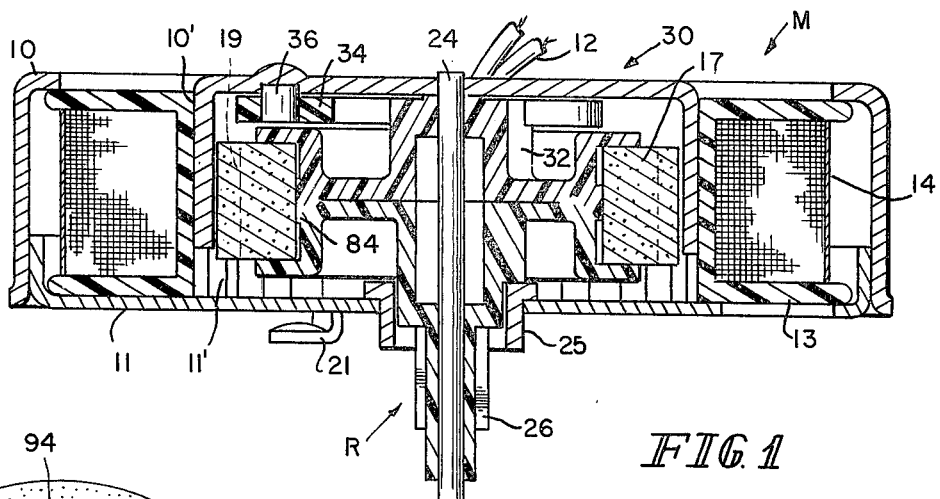
FIG. 1 is a section of a synchronous motor showing the rotor of the present invention.

Referring now to the drawings, the component parts of the present invention can be visualized. A synchronous motor M includes a top shell 10 and a bottom shell 11 which are held together to form a housing. The material for the shells 10 and 11 may be ordinary cold-rolled steel, preferably annealed. Integral poles 10' and 22' are formed by lancing radial strips out of the flat portions of the respective shells and forming them parallel to the center axis to form a circle of pole tips. The poles that are formed in the shells constitute stator field poles and when intermeshed provide a stator assembly for the motor of the present invention. Tabs 21, lanced from shell 11, provide a means for connecting a gear train housing (not shown) to the motor by engaging the tabs with cooperating apertures in the gear train housing.

An energizing winding or coil 14, which includes an insulated spool wound with a predetermined number of turns of wire, is annularly disposed in the space between the ID of the shells 10 and 11 and the intermeshed stator poles 10' and 11' defining a circle. The wire is wound on a bobbin 13. Electrical leads 12 enables the coil to be connected to an AC power source.

The rotor R of the synchronous motor includes a permanent magnet in the shape of a ring 17 carried by a hub 18. The permanent magnet includes a material of a relatively high energy product partial oriented ceramic such as a barium ferrite ceramic magnet with its outer periphery being impressed or magnetized into separate pole segments 19 of alternate north and south polarity. The permanent magnet material preferably has an energy product of at least $1.4 \times 10^6$ gauss oersteds, and has a relatively large diameter to thickness ratio (about 4 to 1) to provide a high torque in a thin package. A suitable material for the magnet could be a material manufactured by Stackpole Carbon Co. and designated Stackpole A–20, for example. As shown, the hub 18 is carried by an axle 24 which is rigidly held to the top shell 10. Hub 18 is free to rotate about the axle within sleeve 25. An output pinion 26 is formed as part of the hub 18.

The motor also includes a one-way directional means 30. One-way directional means 30 includes a member 32 in the shape of a cam carried by the rotor hub 18 and a restraining member in the form of a pawl 34 pivotally carried about post 36 which is fixedly carried by the shell 10. Pawl 34 cooperates with cam 32 to stop the rotor from a wrong-way directional travel as will be hereinafter described.

In operation, when an AC current is applied to the coil 14, the rotor of the motor will begin to rotate due to the magnetic flux paths generated between the rotor poles and the stator poles, the starting of the rotor being initiated by an asymmetrical arrangement of the stator poles. Once the rotor is turning, a high running torque will be achieved through the combination of the rotor structure with its magnet of a material of relatively high energy product partial ceramic and strong distinct poles, and the stator arrangement which provides alternating flux characteristics at individual poles.

The rotor may, however, start in the wrong direction. When this occurs, the directional means 30 will stop the motor and start the rotor in the right direction. For example, assume that directional means 30 is arranged to provide continuous running in a counter-clockwise direction. When the rotor is running in this direction, cam 32 will bias pawl 34 outward and permit the rotor to rotate. If the rotor starts to turn clockwise, steps of the cam will engage the pawl to stop the rotor and additionally cause it to rebound and start in the right direction.

The construction of rotor R is such that close tolerance of the hub and the permanent magnet is readily achieved, especially as regards the rotor poles with respect to the stator poles, and additionally the permanent magnet is securely held by the hub without there being a strong tendency for the magnet to break. In addition, the method of fabricating the rotor is relatively low in cost.

As shown, rotor R includes a hub 18, which is comprised of at least two sections, 18' and 18'', which carry permanent magnet 17. Section 18' includes a body member 40 and a web 42 having a substantially flat face 44 to provide a circular disc 46. The outer periphery of web 42 has a chamfered rim 48 extending therefrom and there is an L-shaped flange 50 also extending from the outer periphery. Rim 48 also includes a skirt 52 extending from the chamfered portion.

Section 18'' includes a body portion 60 and a web 62 having a substantially flat face 64 providing a circular disc 66. The outer periphery of web 62 has a chamfered rim 68 and there is an L-shaped flange 70 extending from the outer periphery. As particularly shown in FIG. 3, the chamfered rims of sections 18' and 18'' are adapted to mate one another so that a good joint may be provided at least at the outer peripheries. Likewise the L-shaped flanges are adapted to mate one another to provide an annular space 41 for permanent magnet 17.

Both sections may be fabricated from a suitable thermoplastic material such as polypropylene, polyamide, polystyrene, polycarbonate, and acetal resins.

Figure 3:
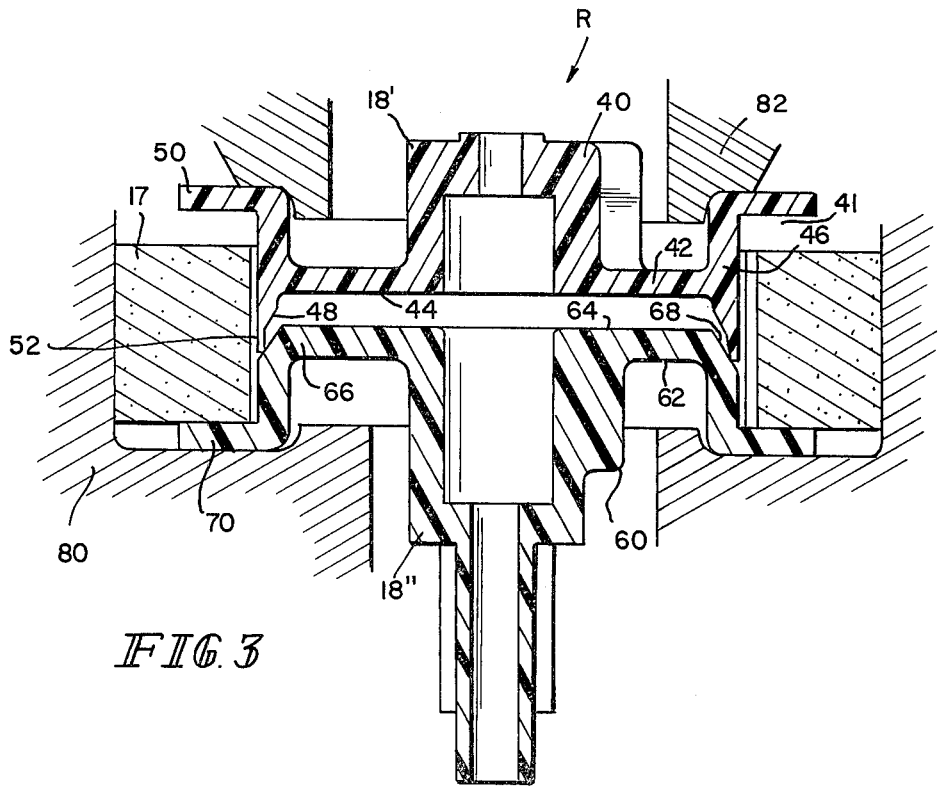
FIG. 3 is a view showing the permanent magnet rotor prior to assembly.

As further shown in FIG. 3, the two sections are positioned in spaced relationship prior to being bonded together. Section 18'' is carried by a lower support number 80; permanent magnet ring 17 is carried by L-shaped flange 70; and section 18' is brought into contact with section 18'' through peripheral skirt 52 by some suitable means (not shown). Heat and pressure is then applied to section 18' such that section 18' can be welded or otherwise bonded to section 18'', principally at the outer peripheries of the circular discs 46 and 66. In accordance with a feature of the present invention, the sections are bonded together through the application of ultrasonic vibrations. To this end, a means to transmit the vibrations such as horn 82 is brought into working relationship with one of the sections (as illustrated in FIG. 3, section 18') such that a weld or bond may be effectuated between the two sections, principally at the outer peripheries. Horn 82 is, in practice, attached to an ultrasonic welding head (not shown) in a manner well known in the art. The horn is suitably shaped to mate section 18' to readily transmit vibrations to the section.

Figure 2:
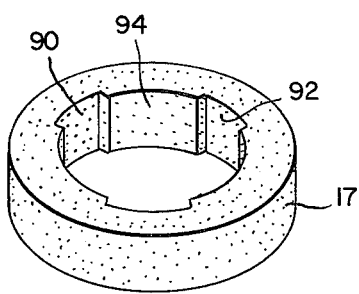
FIG. 2 is a perspective view of a permanent magnet.

The welding head is, in practice, a sonic converter for converting alternating current into mechanical vibrations at the same frequency. Such frequencies are usually in the ultrasonic range of from 20,000 vibrations per second. Horn 82 maintains pressure against the section and sets up an ultrasonic wave path therethrough. The vibrations set up at the contact joint between skirt 52 and chambered rim 68 generate heat at or near the joint, causing skirt 52 to melt thus allowing the two sections to join together. The vibrations are continued until the sections are welded together, at least at the outer periphery, to form an integral bond 84 (FIG. 2).

Permanent magnet 17 includes a means 90 preventing angular displacement of the magnet with respect to the hub during and after bonding of the two sections together. Means 90 includes at least one recess 92 provided in the inner wall 94 of the magnet. During the bonding process, material from at least skirt 52 flows into recesses 92 such that the magnet may not be angularly displaced.

What is claimed is:

1. A method of forming a permanent magnet rotor comprising:
   a. providing a hub of at least two sections,
   b. positioning a permanent magnet having at least one recess therein between said sections at their outer peripheries, and
   c. applying an ultrasonic vibration to at least one of said sections to bond said sections together at their outer peripheries, at least a portion of said sections being melted and flowing into at least said recess whereby said permanent magnet is secured in place.

2. A method according to claim 1 wherein said sections are fabricated from plastic.

3. A method according to claim 2 wherein said plastic is a thermoplastic material taken from the group converting essentially of polyprolene, polyamide, polystyrene, polycarbonate, and acetal resins.

* * * * *

UNITED STATES PATENT OFFICE
CERTIFICATE OF CORRECTION

PATENT NO. : 3,881,243

DATED : 05/06/75

INVENTOR(S) : Albert C. Bannon

It is certified that error appears in the above-identified patent and that said Letters Patent are hereby corrected as shown below:

Col. 1, line 52 delete "tow" and substitute therefore ---two---

Col. 2, line 21 delete "22'" and substitute therefore ---11'---

Signed and sealed this 15th day of July 1975.

(SEAL)
Attest:

RUTH C. MASON
Attesting Officer

C. MARSHALL DANN
Commissioner of Patents
and Trademarks